United States Patent [19]

Seki et al.

[11] Patent Number: 4,739,393
[45] Date of Patent: Apr. 19, 1988

[54] CIRCUIT FOR PERFORMING WHITE BALANCE CORRECTION USING TWO COLOR TEMPERATURE SENSORS

[75] Inventors: Mitsuo Seki, Daito; Keiichi Tanii, Ibaraki, both of Japan

[73] Assignee: Sanyo Electric Co., Ltd., Osaka, Japan

[21] Appl. No.: 925,943

[22] Filed: Nov. 3, 1986

[30] Foreign Application Priority Data

Nov. 5, 1985 [JP] Japan ............... 60-247472
Nov. 5, 1985 [JP] Japan ............... 60-247473
Dec. 18, 1985 [JP] Japan ............... 60-284969

[51] Int. Cl.$^4$ .............................. H04N 9/73
[52] U.S. Cl. .............................. 358/29
[58] Field of Search ....................... 358/29 C

[56] References Cited

FOREIGN PATENT DOCUMENTS 218995 11/1985 Japan ............... 358/29 C
240291 11/1985 Japan ............... 358/29 C

OTHER PUBLICATIONS

Fujishige et al, Automatic-Tracing AWC System for Video Cameras, National Technical Report, vol. 31, Feb. 1985, p. 98.
Shimizu et al, Automatic-Tracing White Balance System for Color Video Cameras, National Technical Report, vol. 31, No. 1, Feb. 1985, p. 90.

Primary Examiner—John W. Shepperd
Attorney, Agent, or Firm—Armstrong, Nikaido, Marmelstein & Kubovcik

[57] ABSTRACT

A circuit for performing white balance correction using two color temperature sensors includes an image sensor for converting an image of an object to a color image signal, a luminance signal/color signal separator for separating an output of the image sensor into a luminance signal and a color signal, and at least one level correction means for correcting a level of the color signal output from the luminance signal/color signal separator, based on a first white balance correction signal or a second white balance correction signal supplied through a switching or disabling means. A first white balance correction signal generator is provided independently of the image sensor and generates the first white balance correction signal correlating to a color temperature of the object. A second white balance correction signal generator generates the second white balance correction signal correlating to the color temperature of the object, based on the luminance signal output from the luminance signal/color signal separator and the color signal having the level corrected by the level correction means.

5 Claims, 4 Drawing Sheets

CIRCUIT FOR PERFORMING WHITE BALANCE CORRECTION USING TWO COLOR TEMPERATURE SENSORS

BACKGROUND OF THE INVENTION

1. Field of the Invention

The present invention relates to a white balance correction circuit, and more particularly, it relates to a white balance correction circuit which is applied to a color video camera or the like.

2. Description of the Prior Art

In general, a fixed system and an automatic-tracing system are employed for white balance correction circuits of color video cameras. The fixed system white balance correction circuit is simpler in structure than the automatic-tracing system one, and is generally applied to various types of color video cameras. However, the fixed system white balance correction circuit inevitably requires complicated white balance set operation, while the same cannot follow color temperature change of light on the object since a white balance correction state is fixed.

Therefore, white balance correction circuits of the automatic-tracing system are increasingly employed in recent color video cameras. Such white balance correction circuits of the automatic-tracing system are mainly provided in two systems. In the first system, a plurality of photodetector devices provided with color filters for different colors are arranged to face an object to detect the color temperature thereof by comparing output levels of the photodetector devices thereby to perform white balance correction in an open loop on the basis of the detected color temperature, as disclosed in Japanese Patent Laying-Open Gazette No. 90886/1983, for example (the circuit of such a system is hereinafter referred to as first automatic-tracing system white balance correction circuit).

In the second system, the gains of red and blue signals are controlled in a closed loop so that average levels of both of color difference signals (R-Y) and (B-Y) included in color video signals are zeroized, as disclosed in "National Technical Report" Vol. 31, No. 1, Feb. 1985, pp. 98–102, for example (the circuit of such a system is hereinafter referred to as second automatic-tracing system white balance correction circuit).

However, although the aforementioned first automatic-tracing system white balance correction circuit operates relatively stably operates with respect to color temperature change of light on the object, accuracy of white balance correction is not sufficiently high since this circuit is in open loop control and the photodetector devices are different in spectrum characteristics from an image pickup element. In other words, the first automatic-tracing system white balance correction circuit may cause slight errors, although the same hardly causes significant errors. Further, the first automatic-tracing system white balance correction circuit has low photosensitivity and cannot correctly operate under low illuminance. Therefore, white balance correction is generally inhibited under low illuminance.

On the other hand, the second automatic-tracing system white balance correction circuit has high correction accuracy due to the closed loop control, whereas the same operates to fade colors on the object when imbalance of color is caused on the object. This is because the second automatic-tracing system white balance correction circuit is adapted to control the gains of the red and blue signals so that average levels of the color difference signals are always zeroized. Thus, although the second automatic-tracing system white balance correction circuit precisely executes white balance correction under prescribed conditions, the same may significantly malfunction depending on conditions.

SUMMARY OF THE INVENTION

Accordingly, it is an object of the present invention to provide a white balance correction circuit which can overcome the disadvantages of both of the aforementioned first and second automatic-tracing system white balance correction circuits and which can continuously perform precise white balance correction.

Briefly stated, the white balance correction circuit according to the present invention is provided with first white balance correction means for performing white balance correction on the basis of the color temperature of an object and second white balance correction means for performing white balance correction on the basis of average levels of color difference signals, to switch operating states of the first white balance correction means and the second white balance correction means in response to the image pickup state of the object.

According to the present invention, disadvantages of the first and second white balance correction means can be eliminated without damaging advantages thereof.

These and other objects, features, aspects and advantages of the present invention will become more apparent from the following detailed description of the present invention when taken in conjunction with the accompanying drawings

DESCRIPTION OF THE PREFERRED EMBODIMENTS

Figure 1:
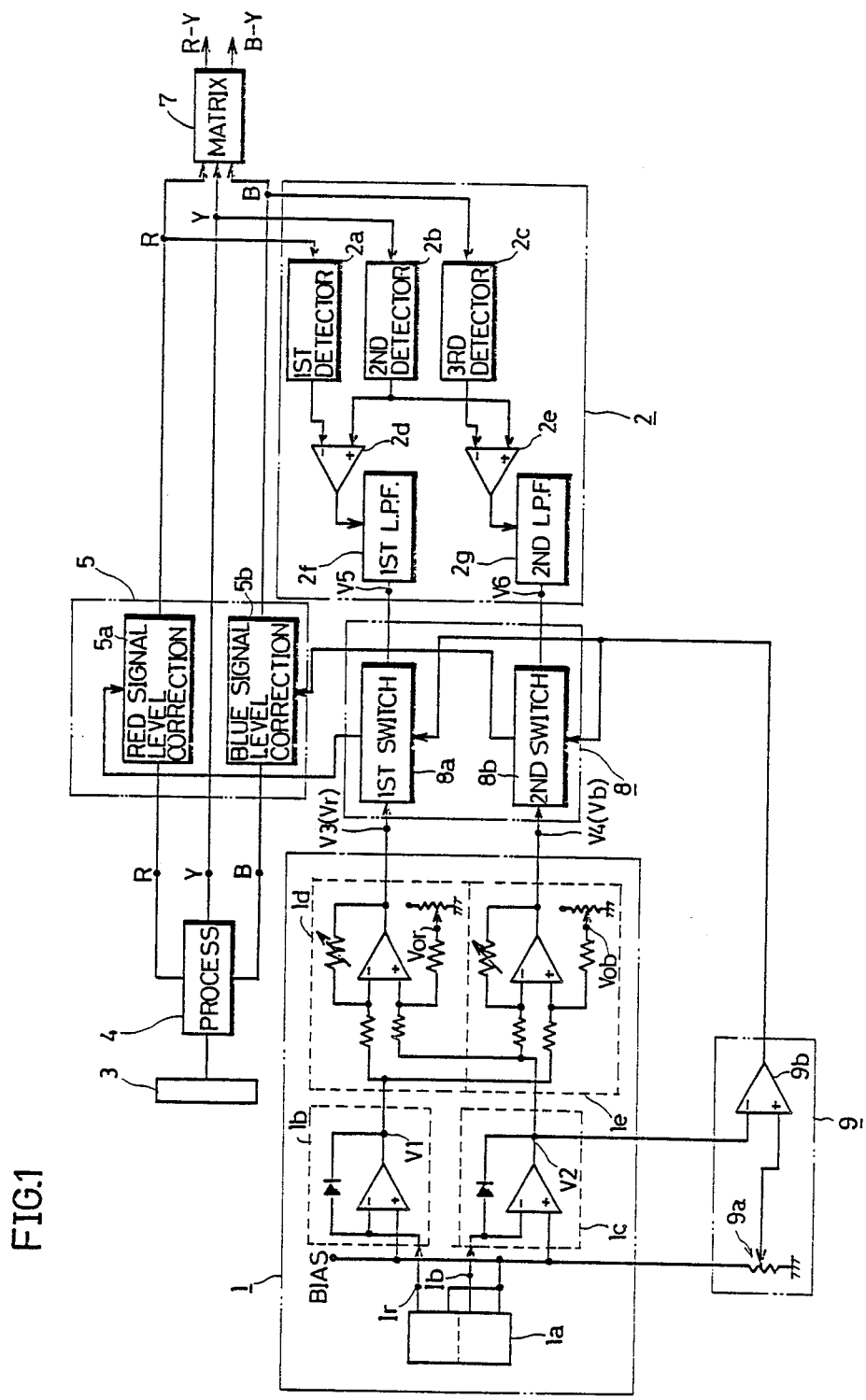
FIG. 1 is a schematic block diagram showing an embodiment of the present invention.

FIG. 1 is a schematic block diagram showing an embodiment of the present invention. Referring to FIG. 1, this embodiment includes a first white balance correction signal generator 1 and a second white balance correction signal generator 2.

The first white balance correction signal generator 1 employs a well-known color temperature correction system which is disclosed in "National Technical Report" Vol. 31, No. 1, Feb. 1985, pp. 90–97. Namely, a photodetector device 1a formed by combining a diode provided with a red filter and a diode provided with a blue filter is fixed to the front surface of a video camera case (not shown), to derive first white balance correction signals on the basis of photoelectric transfer outputs thereof. More concretely, a red photoelectric transfer current Ir and a blue photelectric transfer current Ib outputted from the photodetector device 1a are inputted in first and second logarithmic amplifiers 1b and 1c respectively. The first and second logarithmic amplifiers 1b and 1c are respectively formed by operational amplifiers and diodes. Respective outputs V1 and V2 from the first and second logarithmic amplifiers 1b and 1c are expressed as follows:

$$V1 \propto \left(\frac{kT}{q}\right) \ln Ir \quad (1)$$

$$V2 \propto \left(\frac{kT}{q}\right) \ln Ib \quad (2)$$

where k represents Boltzmann's constant, T represents absolute temperature and q represents amount of electron charges.

The outputs from the first and second logarithmic amplifiers 1b and 1c are respectively inputted in first and second differential amplifiers 1d and 1e. The first and second differential amplifiers 1d and 1e are respectively formed by operational amplifiers and resistor elements. Outputs from these first and second differential amplifiers 1d and 1e are expressed as follows:

$$V3 = \left[Kr\left(\frac{kT}{q}\right)\ln\frac{Ib}{Ir}\right] + Vor = Vr \quad (3)$$

$$V4 = \left[Kb\left(\frac{kT}{q}\right)\ln\frac{Ir}{Ib}\right] + Vob = Vb \quad (4)$$

where Kr and Kb represent constants, Vor represents bias voltage of the first differential amplifier 1d and Vob represents the voltage of the second differential amplifier 1e.

Thus, red control voltage Vr is derived from the first differential amplifier 1d and blue control voltage Vb is derived from the second differential amplifier 1e respectively as first white balance correction signals.

The output from a CCD solid-state image pickup element 3 for converting the image of an object into an electric signal is inputted in a process circuit 4. This process circuit 4 is adapted to separate a picture signal from the solid-state image pickup element 3 into a red signal R, a blue signal B and a luminance signal Y. The red signal R and the blue signal B are inputted in a red signal level correction circuit 5a and a blue signal level correction circuit 5b respectively, to be subjected to level adjustment for white balance correction. Namely the red signal level correction circuit 5a and the blue signal level correction circuit 5b form a color signal level correction circuit 5. The red and blue signals R and B passing through the color signal level correction circuit 5 and the luminance signal Y outputted from the process circuit 4 are supplied to a matrix circuit 7, to be converted into color difference signals (R-Y) and (B-Y).

On the other hand, the second white balance correction signal generator 2 is adapted to derive second white balance correction signals for correcting the red signal R and the blue signal B so that mean values of respective levels of the aforementioned color difference signals (R-Y) and (B-Y) are always "0". More concretely, the output signal R from the red signal level correction circuit 5a, the luminance signal Y and the output signal B from the blue signal level correction circuit 5b are supplied to a first detector circuit 2a, a second detector circuit 2b and a third detector circuit 2c respectively, to be subjected to amplitude detection. The respective detector circuits 2a, 2b and 2c are adapted to perform peak detection of input signals. The output from the first detector circuit 2a detecting the red signal R and that from the second detector circuit 2b detecting the luminance signal Y are inputted in a first comparator 2d, to be converted into first detection color difference signals. The first detection color difference signals (binary signals of "1" and "0") are averaged in level in a first low-pass filter 2f, to be converted into red control voltage V5. On the other hand, the output from the third detector circuit 2c detecting the blue signal B and that from the second detector circuit 2b detecting the luminance signal Y are inputted in a second comparator 2e, to be converted into second detection color difference signals. The second detection color difference signals (binary signals of "1" and "1") are averaged in level in a second low-pass filter 2g, to be converted into blue control voltage V6. The red control voltage V5 and the blue control voltage V6 are derived as second white balance correction signals.

The first white balance correction signals V3 and V4 and the second white balance correction signals V5 and V6 are inputted in a correction signal switching circuit 8. The correction signal switching circuit 8 includes a first switch 8a and a second switch 8b. The first switch 8a is supplied with the red control voltage V3 from the first white balance correction signal generator 1 and the red control voltage V5 from the second white balance correction signal generator 2. The second switch 8b is supplied with the blue control voltage V4 from the first white balance correction signal generator 1 and the blue control voltage V6 from the second white balance correction signal generator 2. Switching at the first and second switches 8a and 8b is performed on the basis of illuminance discrimination output derived from an illuminance discriminator circuit 9. The illuminance discriminator circuit 9 includes a reference voltage generating means 9a and a comparator 9b for comparing reference voltage obtained from the reference voltage generating means 9a with the output V2 from the second logarithmic amplifier 1c. The comparator 9b derives illuminance discrimination output of a high level when the output V2 of the second logarithmic amplifier 1c exceeds the aforementioned reference voltage. The first and second switches 8a and 8b select the first white balance correction signals to supply the same to the color signal level correction circuit 5 when the high-level illuminance discrimination output is inputted under high illuminance. On the other hand, when a low-level illuminance discrimination output is inputted under low illuminance, the first and second switches 8a and 8b select the second white balance correction signals to supply the same to the color signal level correction circuit 5.

The red signal level correction circuit 5a and the blue signal level correction circuit 5b adjust the levels of the red signal R and the blue signal B in response to the supplied first or second white balance correction signals. Thus, the color signal level correction circuit 5 and the first white balance correction signal generator 1 form first white balance correction means of open loop control while the color signal level correction circuit 5 and the second white balance correction signal generator 2 form second white balance correction means of closed loop control. In other words, the color signal level correction circuit 5 is commonly utilized by two white balance correction means.

As hereinabove described, correction is performed by the first white balance correction signals under high illuminance in which the first white balance correction signal generator 1 operates effectively while correction is performed by the second white balance correction signals under low illuminance in which the first white balance correction signal generator 1 does not operate effectively, in the first embodiment. According to the first embodiment, therefore, photosensitivity is not lowered under low illuminance and white balance correction can be precisely performed within a wide illuminance range. Although slight correction error of color may be caused under low illuminance in the first embodiment, such slight correction error of color can be visually disregarded in a dark state of the entire scene.

Figure 2:
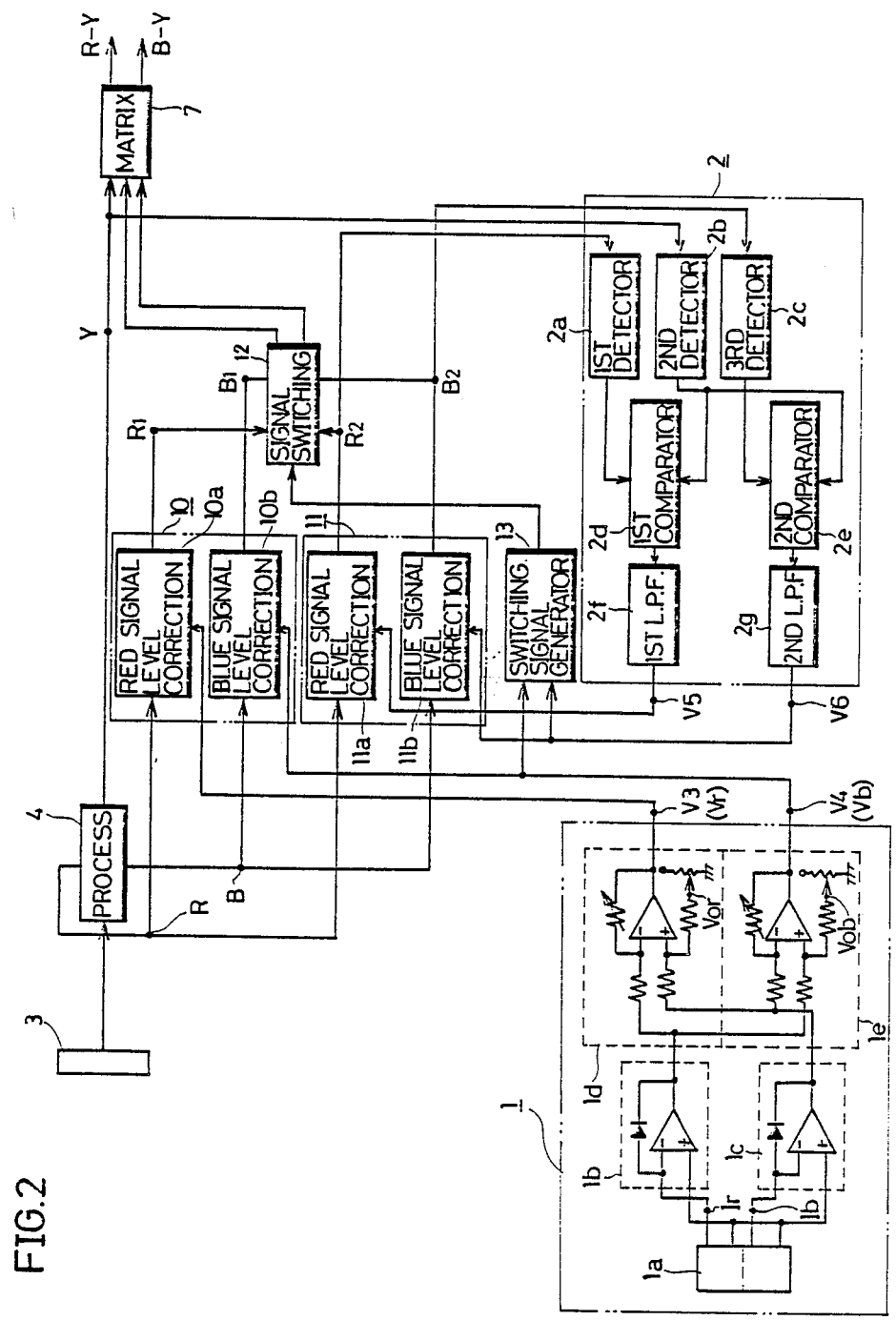
FIG. 2 is a schematic block diagram showing another embodiment of the present invention.

FIG. 2 is a schematic block diagram showing another embodiment of the present invention. Referring to FIG. 2, this embodiment includes a first white balance correction signal generator 1 and a second white balance correction signal generator 2 similarly to the embodiment as shown in FIG. 1. A CCD solid-state image pickup element 3, a process circuit 4 and a matrix circuit 7 are structured similarly to those in the embodiment as shown in FIG. 1. Each of a red signal R and a blue signal B outputted from the process circuit 4 is branched into two propagation paths to be supplied to a first color signal level correction circuit 10 and a second color signal level correction circuit 11. The first color signal level correction circuit 10 includes a red signal level correction circuit 10a and a blue signal level correction circuit 10b, which perform level correction of the red signal R and the blue signal B on the basis of first white balance correction signals from the first white balance correction signal generator 1 respectively. The second color signal level correction circuit 11 includes a red signal level correction circuit 11a and a blue signal level correction circuit 11b, which perform level correction of the red signal R and the blue signal B on the basis of second white balance correction signals from the second white balance correction signal generator 2 respectively. The output R2 from the red signal level correction circuit 11a and the output B2 from the blue signal level correction circuit 11b are supplied to a first detector circuit 2a and a third detector circuit 2c in the second white balance correction signal generator 2 respectively. A second detector circuit 2b is supplied with a luminance signal Y from the process circuit 4. In this embodiment, therefore, the first color signal level correction circuit 10 and the first white balance correction signal generator 1 form first white balance correction means of open loop control while the second color signal level correction circuit 11 and the second white balance correction signal generator 2 form second white balance correction means of closed loop control. Further, the outputs R1 and B1 from the first color signal level correction circuit 10 and the outputs R2 and B2 from the second color signal level correction circuit 11 are supplied to a signal switching circuit 12. Switching of the signal switching circuit 12 is performed by a switching signal derived from a switching signal generator 13. The switching signal generator 13 is adapted to detect whether or not level difference between blue control voltage V4 derived from the first white balance correction signal generator 1 and blue control voltage V6 derived from the second white balance correction signal generator 2 is larger than a predetermined value. The signal switching circuit 12 selects either the output from the first color signal level correction circuit 10 or that from the second color signal level correction circuit 11 in response to the switching signal derived from the switching signal generator 13, to supply the same to the matrix circuit 7.

In the aforementioned structure, the switching signal generator 13 compares the level of the blue control voltage V4 in the first white balance correction signals with the level of the blue control voltage V6 in the second white balance correction signals to generate a switching signal when the level difference between the same is larger than a predetermined value recognizing that imbalance of color is caused on the screen and the second white balance correction signals are not correct. When, on the other hand, the said level difference is smaller than the predetermined value, the switching signal generator 13 de-energizes the switching signal recognizing that the second white balance correction signals are correct. The signal switching circuit 12, which receives the switching signal as control input, selects the outputs R1 and B1 of the first color signal level correction circuit 10 upon generation of the switching signal while selecting the outputs R2 and B2 from the second color signal level correction circuit 11 upon de-energization of the switching signal, to supply the same to the matrix circuit 7. Thus, in the embodiment as shown in FIG. 2, correction is performed by the first white balance correction signals when imbalance of color is caused on the object while correction is performed by the second white balance correction signals when no imbalance of color is caused on the object, whereby optimum white balance correction can be always realized regardless of imbalance of color on the object.

Figure 3:
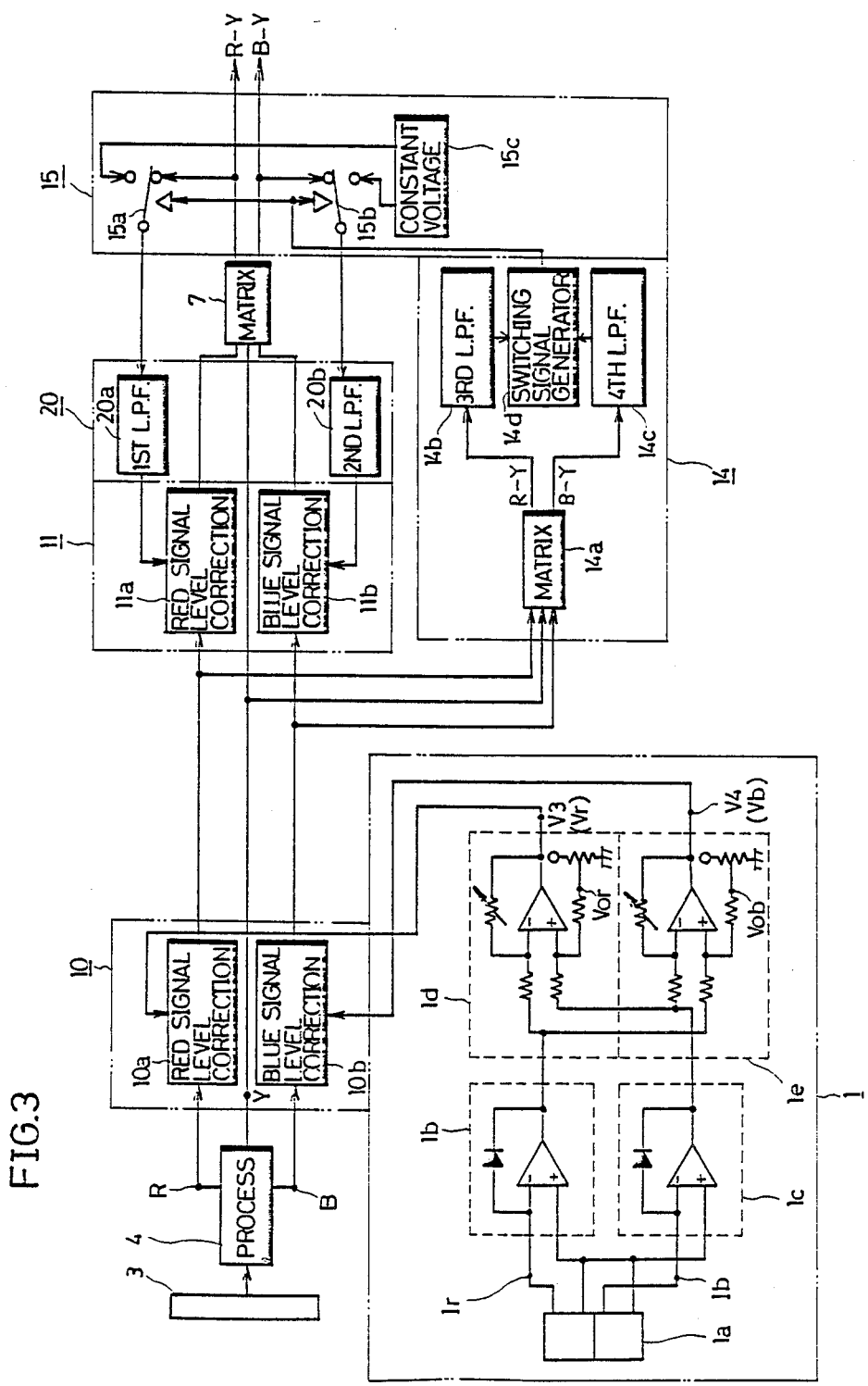
FIG. 3 is a schematic block diagram showing still another embodiment of the present invention.

FIG. 3 is a schematic block diagram showing still another embodiment of the present invention. Referring to FIG. 3, first white balance correction means formed by a first color signal level correction circuit 10 and a first white balance correction signal generator 1 and second white balance correction means formed by a second color signal level correction circuit 1 and a second white balance correction signal generator 20 are serially connected to be interposed between a process circuit 4 and a matrix circuit 7. Namely, color signals corrected by the first white balance correction means are recorrected by the second white balance correction means in this embodiment. The first and second white balance correction means are substantially similar in structure to those of the embodiment as shown in FIG. 2 except for that those of this embodiment are provided in a serial manner with respect to the same color signal propagation path. However, the second white balance correction signal generator 20 forming the second white balance correction means receives color difference signals obtained from the matrix circuit 7, and hence the same includes only two low-pass filters 20a and 20b while detector circuits and comparators for creating color difference signals are omitted.

The embodiment as shown in FIG. 3 further comprises a color determination circuit 14 for determining whether or not imbalance of color is caused on the object and an inhibiting circuit 15 for inhibiting correction operation of the second white balance correction means in response to determination output from the color determination circuit 14. The color determination circuit 14 includes a matrix circuit 14a for receiving color signals R and B corrected by the second color signal level correction circuit 10 and a luminance signal Y from the process circuit 4 to create two types of color difference signals (R-Y) and (B-Y), a third low-pass filter 14b for outputting the average level of one color difference signal (R-Y) from the matrix circuit 14a, a fourth low-pass filter 14c for outputting the average level of the other color difference signal (B-Y) and a switching signal generator 14d for generating a switching signal when at least one of the outputs from the third and fourth low-pass filters 14b and 14c exceeds a prescribed level.

The switching signal derived from the switching signal generator 14d is supplied to switches 15a and 15b provided in the inhibiting circuit 15. The switch 15a is adapted to select either the color difference signal (R-Y) from the matrix circuit 7 or the constant voltage output from a constant voltage generator 15c in response to the switching signal, to output the same. The color difference signal or the constant voltage output selected by the switch 15a is supplied to a first low-pass filter 20a in the second white balance correction signal generator 20. On the other hand, the switch 15b is adapted to select either the color difference signal (B-Y) from the matrix circuit 7 or the constant voltage output of the constant voltage generator 15c in response to the switching signal from the switching signal generator 14d, to output the same. The color difference signal or the constant voltage output selected by the switch 15b is supplied to a second low-pass filter 20b in the second white balance correction signal generator 20.

Figure 4:
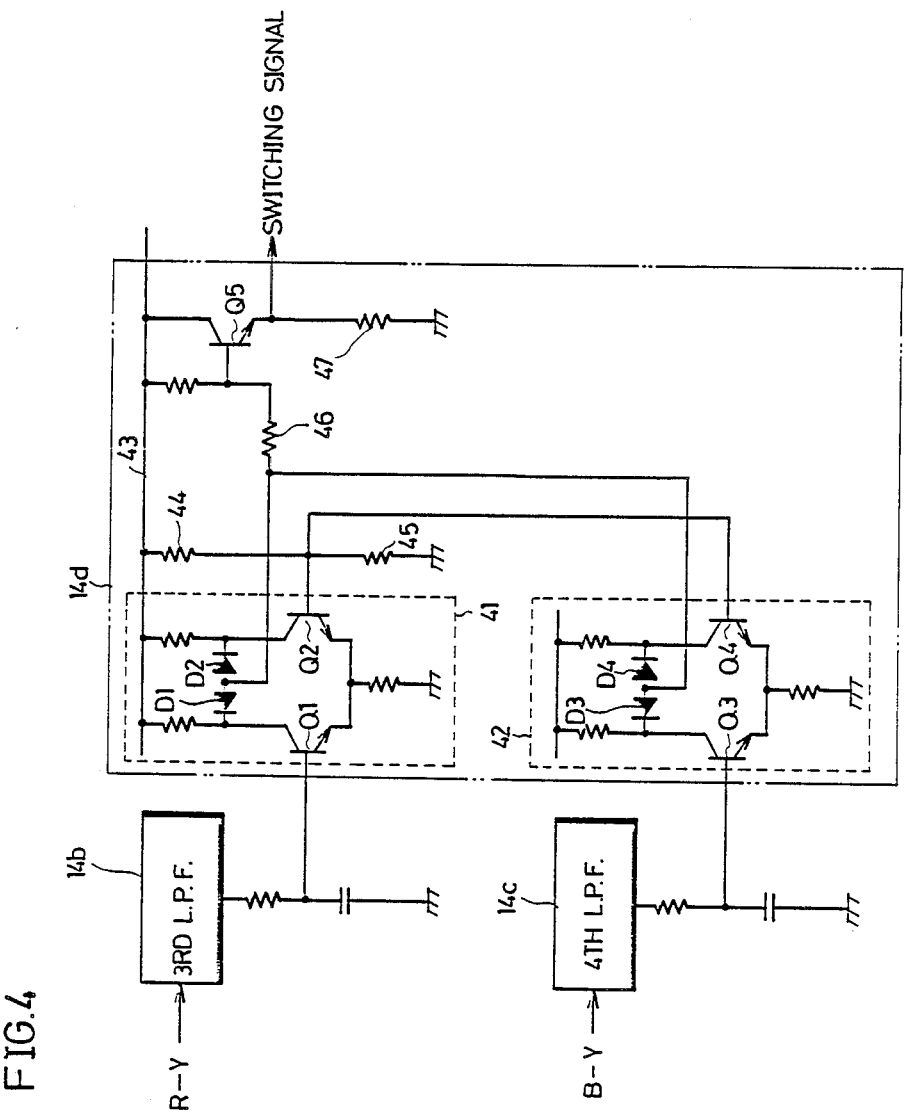
FIG. 4 is a circuit diagram showing the detail of a switching output generator 18 in the embodiment as shown in FIG. 3.

FIG. 4 is a circuit diagram showing the detail of the switching signal generator 14d as shown in FIG. 3. Referring to FIG. 4, the output from the third low-pass filter 14b is inputted in the base of a transistor Q1 within two transistors Q1 and Q2 provided in a first differential circuit 41. Fixed voltage, which is created by bleeder resistors 44 and 45 serially interposed between a power supply line 43 and the ground, is applied to the base of the transistor Q2. The respective collectors of the transistors Q1 and Q2 are connected with cathodes of diodes D1 and D2. Anodes of the diodes D1 and D2 are commonly connected. The potential at the common node of the diodes D1 and D2 is transmitted to the base of an output transistor Q5 through a resistor 46. The collector of the output transistor Q5 is connected with the power supply line 43 while the emitter thereof is grounded through a resistor 47. The switching signal is derived from the emitter of the output transistor Q5. On the other hand, the output from the fourth low-pass filter 14c is inputted in the base of a transistor Q3 within two transistors Q3 and Q4 provided in a second differential circuit 42. Fixed voltage created by the bleeder resistors 44 and 45 is applied to the base of the transistor Q4. The respective collectors of the transistors Q3 and Q4 are connected with the cathodes of diodes D3 and D4. The anodes of the diodes D3 and D4 are commonly connected, and the potential at the common node thereof is transmitted to the base of the output transistor Q5 through the resistor 46.

In the aforementioned structure, the first differential circuit 41 is set so that the transistors Q1 and Q2 are held in equilibrium states when the output voltage of the third low-pass filter 14b is around zero. Therefore, the potential at the common node of the diodes D1 and D2 is at a high level when the output voltage of the third low-pass filter 14d is around zero, while the same drops to a low level when the said output voltage comes out of the zero level. Similarly, the second differential circuit 43 is set so that the transistors Q3 and Q4 are held in equilibrium states when the output voltage of the fourth low-pass filter 14c is around zero, whereby the potential at the common node of the diodes D1 and D2 is at a high level when the output voltage of the fourth low-pass filter is around zero, while dropping to a low level when the said output voltage comes out of the zero level. More concretely, the transistor Q1 conducts when color tendency of the object is red and the transistor Q3 conducts when the color tendency of the object is blue while the transistor Q2 or Q4 conducts when color tendency of the object is green respectively, whereby the potential at the common node of the diodes D1 and D2 or that of the diodes D3 and D4 drops to a low level. When at least one of the common node of the diodes D1 and D2 and that of the diodes D3 and D4 drops to a low level, the output transistor Q5 enters a conducting state to output the switching signal from its emitter.

When no switching signal is generated from the switching signal generator 14d, the switches 15a and 15b of the inhibiting circuit 15 selects the color difference signals (R-Y) and (B-Y) outputted from the matrix circuit 7 to supply the same to the second white balance correction signal generator 20. Therefore, the second white balance correction means (20, 11) perform correction operation at this time, so that the color signals corrected by the first white balance correction means (1, 10) are recorrected by the second white balance correction means (20, 11). When, on the other hand, the switching signal is generated from the switching signal generator 14d, the switches 15a and 15b are respectively switched to select the constant voltage output from the constant voltage generator 15c, thereby to supply the same to the second white balance correction signal generator 20. As the result, the red signal level correction circuit 11a and the blue signal level correction circuit 11b in the second color signal level correction circuit 11 derive outputs without changing the levels of the inputted color signals. Thus, the correction operation of the second white balance correction means (20, 11) is inhibited at this time.

In the embodiment of FIG. 3 as hereinabove described, the correction operation of the second white balance correction means (20, 11) is inhibited when the color determination circuit 14 determines that imbalance of color is caused on the object, whereby white balance correction can be precisely performed even if an object having imbalance of color is image-acquisited, without lowering saturation.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A white balance correction circuit, comprising:
   an image sensor means for converting an image of an object to a color image signal;
   a luminance signal/color signal separation means for separating an output of said image sensor means into a luminance signal and a color signal;
   a level correction means for correcting a level of said color signal outputted from said luminance signal/color signal separation means, based on a first white balance correction signal or a second white balance correction signal supplied through a switching means;
   a first white balance correction signal generating means provided indepedently of said image sensor means for generating said first white balance correction signal correlating to a color temperature of said object;

a second white balance correction signal generating means for generating said second white balance correction signal correlating to the color temperature of said object, based on said luminance signal output from said luminance signal/color signal separation means and said color signal having the level corrected by said level correction means;

an illuminance determination means electrically connected to said first white balance correction signal generating means for determining whether the illuminance of said object is higher than a predetermined value or not, based on a predetermined signal generated in said first white balance correction signal generating means; and said switching means responsive to an output of said illuminance determination means for selecting and outputting said first white balance correction signal when the illuminance of said object is higher than said predetermined value, and selecting and outputting said second white balance correction signal when the illuminance of said object is not higher than said predetermined value.

2. A white balance correction circuit in accordance with claim 1, wherein said illuminance determination means detects said amount of light on said object on the basis of a blue signal obtained from said first white balance connection signal generating means.

3. White balance correction circuit, comprising:

an image sensor means for converting an image of an object to a color image signal;

a luminance signal/color signal separation means for separating an output of said image sensor means into a luminance signal and a color signal;

a first white balance correction signal generating means provided independently of said image sensor means for generating a first white balance correction signal correlating to a color temperature of said object;

a first level correction means for correcting a level of said color signal outputted from said luminance signal/color signal separation means, based on said first white balance correction signal;

a second level correction means provided parallel to said first level correction means for correcting the level of said color signal output from said luminance signal/color signal separation means, based on a second white balance correction signal output from a second white balance correction signal generating means;

said second white balance correction signal generating means for generating said second white balance correction signal correlating to the color temperature of said object, based on said luminance signal output from said luminance signal/color signal separation means and said color signal having the level corrected by said second level correction means;

a level difference determination means for determining whether a level difference between said first white balance correction signal and said second white balance correction signal is higher than a predetermined value or not; and a switching means responsive to an output of said level difference determination means for selecting and providing an output of said first level correction means when said level difference is higher than said predetermined value, and selecting and providing an output of said second level correction means when said level difference is not higher than said predetermined value.

4. A white balance correction circuit, comprising:

an image sensor means for converting an image of an object to a color image signal;

a luminance signal/color signal separation means for separating an output of said image sensor means into a luminance signal and a color signal;

a first white balance correction siganl generating means provided independently of said image pickup means for generating a first white balance correction signal correlating to a color temperature of said object;

a first level correction means for correcting a level of said color signal output from said luminance signal/color signal separation means, based on said first white balance correction signal;

a second level correction means for recorrecting the level of said color signal corrected by said first level correction means, based on a second white balance correction signal outputted from a second white balance correction signal generating means;

said second white balance correction signal generating for generating said second white balance correction signal correlating to the color temperature of said object, based on said luminance signal output from said luminance signal/color signal separation means and said color signal having the level recorrected by said second level correction means;

a level determination means for forming two kinds of color difference signals based on said luminance signal output from said luminance signal/color signal separation means and said color signal having the level corrected by said first level correction means, to determine whether an average level of at least either of said two kinds of color difference signals is outside a predetermiend level range or not, and a disabling means responsive to an output of said level determination means for disabling said second white balance correction signal generating means when the average level of at least either of said two kinds of color difference signals is outside of said predetermined level range.

5. A white balance correction circuit in accordance with claim 4, wherein said disabling means disables said second white balance correction signal generating means by inputting fixed signals to said second white balance connection signal generating means in place of color difference signals.

* * * * *